United States Patent
Tang et al.

(10) Patent No.: US 9,269,084 B2
(45) Date of Patent: *Feb. 23, 2016

(54) APPARATUS AND METHOD FOR COMMERCIAL TRANSACTIONS USING A COMMUNICATION DEVICE

(71) Applicant: 4361423 Canada Inc., Montreal (CA)

(72) Inventors: Tai Kwan Jimmy Tang, Hong Kong (CN); Chi Wah Lo, Hong Kong (CN); Kenneth G. Mages, Chicago, IL (US)

(73) Assignee: 4361423 Canada Inc., Montreal (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/673,181

(22) Filed: Mar. 30, 2015

(65) Prior Publication Data

US 2015/0206133 A1    Jul. 23, 2015

Related U.S. Application Data

(63) Continuation of application No. 13/957,530, filed on Aug. 2, 2013, now Pat. No. 9,016,566, which is a continuation of application No. 13/283,314, filed on Oct. 27, 2011, now Pat. No. 8,534,554, which is a (Continued)

(51) Int. Cl.
*G06Q 20/34* (2012.01)
*G06Q 20/32* (2012.01)

(Continued)

(52) U.S. Cl.
CPC .............. *G06Q 20/353* (2013.01); *G06K 7/082* (2013.01); *G06Q 20/32* (2013.01); *G06Q 20/322* (2013.01); *G06Q 20/325* (2013.01); *G06Q 20/327* (2013.01); *G06Q 20/3272* (2013.01);

(Continued)

(58) Field of Classification Search
CPC ... G06Q 20/353; G06Q 20/32; G06Q 20/322; G06Q 20/325; G06Q 20/327; G06Q 20/3272; G06Q 20/425; G06Q 20/341; G06Q 2220/00; G06K 7/082

See application file for complete search history.

(56) References Cited

U.S. PATENT DOCUMENTS

| | | |
|---|---|---|
| 4,845,740 A | 7/1989 | Tokuyama |
| 5,097,708 A | 3/1992 | Kobayashi |

(Continued)

FOREIGN PATENT DOCUMENTS

| | | |
|---|---|---|
| CN | 1246941 | 3/2000 |
| CN | 1928907 | 3/2007 |

(Continued)

OTHER PUBLICATIONS

International Search Report for International Application No. PCT/US2009/036564 mailed on May 5, 2009 (2 pages).

(Continued)

*Primary Examiner* — Kristy A Haupt
(74) *Attorney, Agent, or Firm* — Nixon Peabody LLP

(57) ABSTRACT

An apparatus for effecting commercial transactions with a server using a transaction card via a communication device is provided. The apparatus includes a transaction device coupled with the communication device for capturing information from the transaction card and a controller for converting the captured card information into an encrypted audio signal and for transmitting the audio signal to the communication device. The communication device delivers the audio signal to the server for processing the commercial transaction.

8 Claims, 4 Drawing Sheets

Related U.S. Application Data continuation of application No. 13/239,512, filed on Sep. 22, 2011, now Pat. No. 8,281,998, which is a continuation of application No. 13/162,001, filed on Jun. 16, 2011, now Pat. No. 8,286,875, which is a continuation of application No. PCT/IB2010/001367, filed on Feb. 10, 2010.

(60) Provisional application No. 61/161,459, filed on Feb. 10, 2009.

(51) Int. Cl.
*G06Q 20/42* (2012.01)
*G06K 7/08* (2006.01)

(52) U.S. Cl.
CPC ............ *G06Q20/341* (2013.01); *G06Q 20/425* (2013.01); *G06Q 2220/00* (2013.01)

(56) References Cited

U.S. PATENT DOCUMENTS

| | | | |
|---|---|---|---|
| 5,204,513 A | 4/1993 | Steele | |
| 5,351,296 A | 9/1994 | Sullivan | |
| 5,371,692 A | 12/1994 | Draeger | |
| 5,677,955 A | 10/1997 | Doggett | |
| 5,754,655 A | 5/1998 | Hughes | |
| 5,764,742 A | 6/1998 | Howard | |
| 5,850,599 A | 12/1998 | Seiderman | |
| 5,883,810 A | 3/1999 | Franklin | |
| 6,006,109 A | 12/1999 | Shin | |
| 6,129,277 A | 10/2000 | Grant | |
| 6,481,623 B1 | 11/2002 | Grant | |
| 6,579,728 B2 | 6/2003 | Grant | |
| 6,749,114 B2 | 6/2004 | Madani | |
| 7,252,232 B2 | 8/2007 | Fernandes | |
| 7,309,012 B2 | 12/2007 | Von Mueller | |
| 7,324,836 B2 | 1/2008 | Steenstra | |
| 7,409,234 B2 | 8/2008 | Glezerman | |
| 7,810,729 B2 | 10/2010 | Morley | |
| 8,281,998 B2 * | 10/2012 | Tang ...................... | G06Q 20/32 235/380 |
| 8,286,875 B2 * | 10/2012 | Tang ...................... | G06Q 20/32 235/380 |
| 8,534,554 B2 * | 9/2013 | Tang ...................... | G06Q 20/32 235/380 |
| 9,016,566 B2 * | 4/2015 | Tang ...................... | G06Q 20/32 235/380 |
| 2002/0002507 A1 | 1/2002 | Hatakeyama | |
| 2002/0030579 A1 | 3/2002 | Albert | |
| 2002/0030871 A1 | 3/2002 | Anderson | |
| 2003/0144040 A1 | 7/2003 | Liu | |
| 2003/0159050 A1 | 8/2003 | Gantman | |
| 2004/0012875 A1 | 1/2004 | Wood | |
| 2004/0041911 A1 | 3/2004 | Odagiri | |
| 2004/0087339 A1 | 5/2004 | Goldthwaite | |
| 2004/0093496 A1 | 5/2004 | Colnot | |
| 2004/0204074 A1 | 10/2004 | Desai | |
| 2005/0247787 A1 | 11/2005 | Von Mueller | |
| 2006/0094481 A1 | 5/2006 | Gullickson | |
| 2006/0122902 A1 | 6/2006 | Petrov | |
| 2006/0223580 A1 | 10/2006 | Antonio | |
| 2007/0250623 A1 | 10/2007 | Hickey | |
| 2007/0299908 A1 | 12/2007 | Martino | |
| 2008/0059370 A1 | 3/2008 | Sada | |
| 2008/0059375 A1 | 3/2008 | Abifaker | |
| 2009/0112768 A1 | 4/2009 | Hammad | |
| 2010/0243732 A1 | 9/2010 | Wallner | |
| 2010/0260341 A1 | 10/2010 | Sander | |
| 2011/0084140 A1 | 4/2011 | Wen | |

FOREIGN PATENT DOCUMENTS

| | | |
|---|---|---|
| CN | 101201947 | 6/2008 |
| EP | 1768071 | 3/2007 |
| WO | WO 02/33669 | 4/2002 |
| WO | WO 2008/049186 | 5/2008 |
| WO | WO 2010/097711 | 9/2010 |
| WO | WO 2010/111130 | 9/2010 |

OTHER PUBLICATIONS

International Search Report for International Application No. PCT/IB10/01367 on Nov. 16, 2010 (4 pages).
Re-examination of U.S. Pat. No. 7,896,248/Control No. 95/001,620: Non-Final Action (dated Jul. 1, 2011) (21 pages).
Re-examination of U.S. Pat. No. 7,896,248/Control No. 95/001,620: Search Notes (1 page).
Re-examination of U.S. Pat. No. 7,896,248/Control No. 95/001,620: Reexamination litigation review (1 page).
Re-examination of U.S. Pat. No. 7,896,248/Control No. 95/001,620: Notice of References Cited (1 page).
Re-examination of U.S. Pat. No. 7,896,248/Control No. 95/001,620: "Turning your mobile into a magnetic stripe reader" by Louis Padilla Visdomine http://classic-web.archive.org/web/20041027001715/http://www.gae.ucm.es/~padilla/extraword/mobilesoundtrack.html retrieved Jun. 20, 2011 (4 pages).
Re-examination of U.S. Pat. No. 7,896,248/Control No. 95/001,620: "Siemens MC60 Cell Phone" Sep. 2, 2008 http://siemphones.blogspot.com/2008/siemens-mc60-review.html (2 pages).
Re-examination of U.S. Pat. No. 7,896,248/Control No. 95/001,620: "Magnetic Stripe Reader Circuit" by Louis Padilla Visdomine http://www.gae.ucm.ed/~padilla/extrawork/mobilesoundtrack.html (7 pages).
Re-examination of U.S. Pat. No. 7,896,248/Control No. 95/001,620: Office Communication Transmittal of Communication to Third Party Requester Inter Partes Reexamination with Order Granting re-Examination for inter partes re-examination and decision granting inter partes examination with Information Disclosure Citation in a Patent (dated Jun. 10, 2011) (24 pages).
Re-examination of U.S. Pat. No. 7,896,248/Control No. 95/001,620: Reexamination litigation review (1 page) (dated Jun. 7, 2011).
Re-examination of U.S. Pat. No. 7,896,248/Control No. 95/001,620: Litigation Search Report CRU 3999 for U.S. Pat. No. 7,896,248 (dated May 19, 2011) (11 pages).
Re-examination of U.S. Pat. No. 7, 896,248/Control No. 95/001,620: Communication to USPTO retransmitting Exhibit 3 filed with Request for Reexamination and Certification of Service (dated May 13, 2011) (2 pages).
Re-examination of U.S. Pat. No. 7,896,248/Control No. 95/001,620: Request for Inter Partes Reexamination of U.S. Pat. No. 7,896,248: Appendices A-G to Request for Inter Partes Reexamination of U.S. Pat. No. 7,896,248 (195 pages).
Re-examination of U.S. Pat. No. 7,896,248/Control No. 95/001,620: U.S. Pat. No. 7,896,248 (Exhibit 1) (13 pages).
Re-examination of U.S. Pat. No. 7,896,248/Control No. 95/001,620: Information Disclosure Citation in a Patent (Exhibit 2) (1 page).
Re-examination of U.S. Pat. No. 7,896,248/Control No. 95/001,620: "Reading Magnetic Cards (almost) for free" by Sebastien Bourdeaudocq ("Lekernel"), posted on Jan. 26, 2009 at http://lekernel.net/blog/?p=12 (Exhibit 3) (2 pages).
Re-examination of U.S. Pat. No. 7,896,248/Control No. 95/001,620: Bib data sheet.
Re-examination of U.S. Pat. No. 7,918,394/ Control No. 95/001,619: Non-Final Office Action (dated Jul. 1, 2011) (27 pages).
Re-examination of U.S. Pat. No. 7,918,394/ Control No. 95/001,619: Search Notes (1 page).
Re-examination of U.S. Pat. No. 7,918,394/ Control No. 95/001,619: Reexamination Litigation Review (1 page).
Re-examination of U.S. Pat. No. 7,918,394/ Control No. 95/001,619: List of references (1 page).
Re-examination of U.S. Pat. No. 7,918,394/ Control No. 95/001,619: "Siemens MC60 Cell Phone" Sep. 2, 2008 http://siemphones.blogspot.com/2008/siemens-mc60-review.html (2 pages).
Re-examination of U.S. Pat. No. 7,918,394/ Control No. 95/001,619: "LG Rumor 2 review" by Philip Berne, May 16, 2009 http://www.infosyncworld.com/reviews/cell-phones/lg-rumor2/10184.html (3 pages).

(56) References Cited

OTHER PUBLICATIONS

Re-examination of U.S. Pat. No. 7,918,394/ Control No. 95/001,619: "Magnetic Stripe Reader Circuit" by Louis Padilla Visdomine http://www.gae.ucm.ed/~padilla/extrawork/mobilesoundtrack.html (7 pages).
Re-examination of U.S. Pat. No. 7,918,394/ Control No. 95/001,619: "Turning your mobile into a magnetic stripe reader" by Louis Padilla Visdomine http://classic-web.archive.org/web/20041027001715/ http://www.gae.ucm.es/~padilla/extraword/mobilesoundtrack.html retrieved Jun. 20, 2011 (4 pages).
Re-examination of U.S. Pat. No. 7,918,394/ Control No. 95/001,619: Office communication Transmittal of Communication to Third Party Requester Inter Partes Reexamination with Order Granting request for inter partes reexamination and Decision Granting Inter Partes Examination dated Jun. 10, 2011 (26 pages).
Re-examination of U.S. Pat. No. 7,918,394/ Control No. 95/001,619: Reexamination litigation review (1 page) (dated Jun. 7, 2011).
Re-examination of U.S. Pat. No. 7,918,394/ Control No. 95/001,619: 37 CFR 1.501 Information Disclosure Citation in a Patent (Exhibit 2) Considered by Examiner dated Jun. 4, 2010 (2 pages).
Re-examination of U.S. Pat. No. 7,918,394/ Control No. 95/001,619: Litigation Search Report CRU 3999 for U.S. Pat. No. 7,918,394.
Re-examination of U.S. Pat. No. 7,918,394/ Control No. 95/001,619: History of U.S. Pat. No. 7,918,394 from LexisNexis dated May 16, 2011 (2 page).
Re-examination of U.S. Pat. No. 7,918,394/ Control No. 95/001,619: Communication to United States Patent and Trademark Office regarding applicant refilling Exhibits 3, 4, 6 and 7 filed with Request for Reexamination and Certificate of Service (dated May 13, 2011) (2 pages).
Re-examination of U.S. Pat. No. 7,918,394/ Control No. 95/001,619: 37 CFR 1.501 Information Disclosure Citation in a Patent (Exhibit 2) (2 pages).
Re-examination of U.S. Pat. No. 7,918,394/ Control No. 95/001,619: Request for Inter Partes Reexamination of U.S. Pat. No. 7,918,394 (dated May 10, 2011) (57 pages).
Re-examination of U.S. Pat. No. 7,918,394/ Control No. 95/001,619: Appendices A-M to Request for Inter Partes Reexamination of U.S. Pat. No. 7,918,394 (dated May 10, 2011) (237 pages).
Re-examination of U.S. Pat. No. 7,918,394/ Control No. 95/001,619: U.S. Pat. No. 7,918,394 (Exhibit 1) (dated Apr. 5, 2011) (9 pages).
Re-examination of U.S. Pat. No. 7,918,394/ Control No. 95/001,619: Information Disclosure Citation in a Patent (Exhibit 2) (2 pages).
Re-examination of U.S. Pat. No. 7,918,394/ Control No. 95/001,619: "Reading Magnetic Cards (almost) for free" by Sebastien Bourdeaudocq ("Lekernel"), posted on Jan. 26, 2009 at http://lekernel.net/blog/?p=12 (Exhibit 3) (2 pages).
Re-examination of U.S. Pat. No. 7,918,394/ Control No. 95/001,619: "MSR500EX (Mini123EX) Portable Magnetic Stripe Card Reader" by Tyner ("Tyner"), posted on Apr. 27, 2007 at http://www.tyner.com/magnetic/msr500ex.htm (Exhibit 4) (3 pages).
Re-examination of U.S. Pat. No. 7,918,394/ Control No. 95/001,619: "Turning your mobile into a magnetic stripe reader" by Luis Padilla Visdomine ("Padilla I"), dated Aug. 30, 2004 (Exhibit 6) (4 pages).
Re-examination of U.S. Pat. No. 7,918,394/ Control No. 95/001,619: "Magnetic Stripe Reader Circuit" ("Padilla II") dated Jan. 28, 1997, Luis Padilla Vlsdomine (Exhibit 7) (7 pages).
Re-examination of U.S. Pat. No. 7,918,394/ Control No. 95/001,619: Bib data sheet (1 page).
Re-examination of U.S. Pat. No. 7,810,729/ Control No. 95/001,618: Non-Final Office Action (dated Jul. 1, 2011) (25 pages).
Re-examination of U.S. Pat. No. 7,810,729/ Control No. 95/001,618: Search Notes (1 page).
Re-examination of U.S. Pat. No. 7,810,729/ Control No. 95/001,618: Reexamination Litigation Review (1 page).
Re-examination of U.S. Pat. No. 7,810,729/ Control No. 95/001,618: List of references (1 page).
Re-examination of U.S. Pat. No. 7,810,729/ Control No. 95/001,618: "Siemens MC60 Cell Phone" Sep. 2, 2008 http://siemphones.blogspot.com/2008/siemens-mc60-review.html (2 pages).
Re-examination of U.S. Pat. No. 7,810,729/ Control No. 95/001,618: "LG Rumor 2 review" by Philip Berne, May 16, 2009 http://www.infosyncworld.com/reviews/cell-phones/lg-rumor2/10184.html.
Re-examination of U.S. Pat. No. 7,810,729/ Control No. 95/001,618: "Magnetic Stripe Reader Circuit" by Louis Padilla Visdomine http://www.gae.ucm.ed/~padilla/extrawork/mobilesoundtrack.html (7 pages).
Re-examination of U.S. Pat. No. 7,810,729/ Control No. 95/001,618: "Turning your mobile into a magnetic stripe reader" by Louis Padilla Visdomine http://classic-web.archive.org/web/20041027001715/ http://www.gae.ucm.es/~padilla/extraword/mobilesoundtrack.html retrieved Jun. 20, 2011 (4 pages).
Re-examination of U.S. Pat. No. 7,810,729/ Control No. 95/001,618: Litigation Search Report CRU 3999 (dated Jun. 14, 2011) (27 pages).
Re-examination of U.S. Pat. No. 7,810,729/ Control No. 95/001,618: Litigation Search Report CRU 3999 (dated Jun. 6, 2011) (26 page).
Re-examination of U.S. Pat. No. 7,810,729/ Control No. 95/001,618: Communication to the United States Patent and Trademark Office regarding re-transmittal of Exhibits 3, 4, 6 and 7 filed with the Request for Reexamination and Certification of Service (dated May 13, 2011) (2 pages).
Re-examination of U.S. Pat. No. 7,810,729/ Control No. 95/001,618: Request for Inter Partes Reexamination of U.S. Pat. No. 7,810,729 (dated May 11, 2011) (62 pages).
Re-examination of U.S. Pat. No. 7,810,729/ Control No. 95/001,618: Appendices A-L to Request for Inter Partes Reexamination of U.S. Pat. No. 7,810,729 (dated May 11, 2011) (259 pages).
Re-examination of U.S. Pat. No. 7,810,729/ Control No. 95/001,618: U.S. Pat. No. 7,810,729 B2 (Exhibit 1) (dated Oct. 12, 2010) (9 pages).
Re-examination of U.S. Pat. No. 7,810,729/ Control No. 95/001,618: 37 CFR 1.501 Information Disclosure Citation in a Patent (Exhibit 2) (2 pages).
Re-examination of U.S. Pat. No. 7,918,394/ Control No. 95/001,619: "Magnetic Stripe Reader Circuit" ("Padilla II") dated Jan. 28, 1997, Luis Padilla Visdomine (Exhibit 7) (7 pages).
Re-examination of U.S. Pat. No. 7,810,729/ Control No. 95/001,618: Bib data sheet (1 page).
Defendants First Amended Answer to Complaint, Affirmative Defenses, and First Amended Counterclaims against Plaintiffs, *Square, Inc. and James McKelvey. Square, Inc. and James McKelvey*, Plaintiffs and Counterclaim Defendants, vs. *REM Holdings 3, LLC, a Missouri LLC*, Defendant and Counterclaim Plaintiff. Civil Action No. 4:10-cv-2243 SNLJ. United States District Court for the Eastern District of Missouri, Eastern Division. Filed May 24, 2011 (24 pages).
Plaintiffs' Answer to Defendant's First Amended Counterclaims Against Plaintiffs *Square, Inc. and James McKelvey, Square, Inc. and James McKelvery*, Plaintiffs and Counterclaim Defendants, vs. *REM Holdings 3, LLC, a Missouri LLC*, Defendant and Counterclaim Plaintiff. Civil Action No. 4:10-cv-2243 SNLJ. United States District Court for the Eastern District of Missouri, Eastern Division. Filed Jun. 10, 2011 (37 pages).
Memorandum in Support of Defendant's Rule 12(b)(6) Motion to Dismiss Plaintiff's Claims of Inequitable Conduct, *Square, Inc. and James McKelvey*, Plaintiffs v. *REM Holdings 3, LLC, a Missouri LLC*, Defendant. United States District Court for the Eastern District of Missouri, Eastern Division. Filed Jun. 30, 2011 (16 pages).
L. Padilla, "The Simplest Magnetic Stripe Reader," http://gae.ucm.es/~padilla/extrawork/soundtrack.html, First version Jan. 27, 2003, last updated Dec. 10, 2009 (5 pages).
Definition of "DC-coupled," http://www.sweetwater.com/expert-center/glossary/t—DC-coupled, Aug 29, 2011 (1 page).
"Computer Microphones," http://web.archive.org/web/20090303083201/http://hobby-hour.com/electronics/com . . . , Aug. 14, 2011 (2 pages).
"Sound Card External Connectors," Gateway Support Document, http://support.gateway.com/s/tutorials/Tu_949612.shtml. Aug. 10, 2011 (2 pages).
Definition of "Game Port," Wikipedia. http://en.wikipedia.org/wiki/Game_port, Aug. 28, 2011 (5 pages).
George Wallner, "Acoustically Coupled Card Reader," U.S. Appl. No. 61/163,296, filed Mar. 25, 2009 (8 pages).

(56) References Cited

OTHER PUBLICATIONS

Reexamination of U.S. Pat. No. 7,896,248/Control No. 95/001,620: Declaration of Robert E. Morely, Jr., Sep. 1, 2011 (12 pages).
Reexamination of U.S. Pat. No. 7,896,248/Control No. 95/001,620: "Square begins taking orders for free credit card reader," http://latimesblogs.latimes.com/technology/2010/05/square.html, May 11, 2010. (Morley Declaration Exhibit A) (1 page).
Reexamination of U.S. Pat. No. 7,896,248/Control No. 95/001,620: "Square ships about 500,000 card readers and launches square card case," http://pulse2.com/2011/05/23/square-ships-about-500000-card-readers-and-launches-square-card-case/, May 23, 2011 (Morley Declaration Exhibit B) (2 pages).
Reexamination of U.S. Pat. No. 7,896,248/Control No. 95/001,620: "Square's Pricing" https://squareup.com/pricing, (Morley Declaration Exhibit C) (1 page).
Reexamination of U.S. Pat. No. 7,896,248/Control No. 95/001,620: "Dealbook of the New York Times" http://dealbook.nytimes.com/2011/06/29/unprofitable-square-valued-at-1-6-billion/, Jun. 29, 2011 (Morley Declaration Exhibit D) (2 pages).
Reexamination of U.S. Pat. No. 7,896,248/Control No. 95/001,620: "iPhone Payments Smackdown: *Square v. VeriFone*" http://pymnts.com/news/businesswire-feed/2009/december/10/iphone-payments-smackdown-square-vs-verifone/?art=, Dec. 14, 2009 (Morley Declaration Exhibit E) (3 pages).
Reexamination of U.S. Pat. No. 7,896,248/Control No. 95/001,620: "VeriFone's PAYware Mobile" http://www.paywaremobile.com/en/gallery (Morley Declaration Exhibit F) (2 pages).
Reexamination of U.S. Pat. No. 7,896,248/Control No. 95/001,620: "Intuit's Mophie Reader pricing" http://mophie.intuit.com (Morley Declaration Exhibit G) (1 page).
Reexamination of U.S. Pat. No. 7,896,248/Control No. 95/001,620: "Roam Data's Universal Secure Mobile Card Reader Solution Chosen by Intuit, Sage, Total Merchant Services, North American Bankcard, and Others," http://www roamdata.com/news/roam-data%E2%80%99s-universal-secure-mobile-card-reader-solution-chosen-intuit-sage-total-merchant-serv, Feb. 22, 2011 (Morley Declaration Exhibit H) (3 pages).
Reexamination of U.S. Pat. No. 7,896,248/Control No. 95/001,620: "Roam Data Secure Swipers Distributed with Intuit Go Payment in Verizon Retail Stores." http://www.roamdata.com/news/roam-data-secure-swipers-distributed-intuit-gopayment-verizon-retail-stores, Aug. 25, 2011 (Morley Declaration Exhibit J) (2 pages).
Reexamination of U.S. Pat. No. 7,896,248/Control No. 95/001,620: "Roam Data has Shipped 300,000 readers." http://bostinno.com/2011/08/10/roam-data-is-the-leading-provider-of-encrypted-mobile-readers-has-shipped-over-300k-devices/, Aug. 10, 2011 (Morley Declaration Exhibit L) (3 pages).
Reexamination of U.S. Pat. No. 7,896,248/Control No. 95/001,620: "History of Blackberry" http://forums.crackberry.com/general-discussion-f2/timeline-history-research-motion-7162, Oct. 25, 2007 (Morley Declaration Exhibit M) (6 pages).
Reexamination of U.S. Pat. No. 7,896,248/Control No. 95/001,620: "History of the iPhone" http://en.wikipedia.org/wiki/History_of_the_iPhone, last modified Dec. 14, 2011 (Morley Declaration Exhibit N) (17 pages).
Reexamination of U.S. Pat. No. 7,896,248/Control No. 95/001,620: "The 50 Best Inventions of 2010." *Time*. Print.
Reexamination of U.S. Pat. No. 7,896,248/Control No. 95/001,620: Wen, Sam. Systems and Methods for Decoding Card Swipe Signals. Patent Application Publication 2011/0084140. Apr. 14, 2011. Print.
Reexamination of U.S. Pat. No. 7,896,248/Control No. 95/001,620: "Magnetic Card Reader" http://web.archive.org/web/20071126091501/http://lekernel.net/scrapbook/cardreader.html (2 pages).
Reexamination of U.S. Pat. No. 7,810,729/Control No. 95/001,620: Declaration of David A Thompson, Sep. 29, 2011 (18 pages).
Reexamination of U.S. Pat. No. 7,810,729/Control No. 95/001,620: Affidavit of Christopher Butler, Sep. 22, 2011 (7 pages).
Reexamination of U.S. Pat. No. 7,810,729/Control No. 95/001,618: "Magnetic Stripe Reader Circuit" by Luis Padilla Visdomine, http://classic-web.archive.org/web/20030218183546/http://www.gae.ucm.es/~padilla/extrawork/magamp.html, Feb. 23, 2003.
Amendment A filed in pending U.S. Appl. No. 12/932,544, filed Nov. 17, 2011 (26 pages).
Amendment A filed in Pending U.S. Appl. No. 13/065,931, filed Nov. 17, 2011 (13 pages).
Inter Partes Reexamination Certificate, U.S. Pat. No. 7,918,394 C1, issued Jan. 17, 2012 (2 pages).
USPTO Office Action and attached, mailed in pending U.S. Appl. No. 12/932,544, filed Feb. 28, 2012 (36 pages).
USPTO Office Action and attachment, mailed in pending U.S. Appl. No. 12/065,931, filed Mar. 1, 2012 (16 pages).
International Search Report and Witten Opinion mailed Jul. 16, 2010 which issued in International Patent Application No. PCT/US2010/001660 (11 pages).
International Search Report and Witten Opinion mailed Mar. 30, 2011which issued in International Patent Application No. PCT/US2011/000137 (6 pages).
Re-examination of U.S. Pat. No. 7,810,729/Control No. 95/001,618: Transmittal of Communication to Third Party Requester in Inter Partes Reexamination with Decision on Petition, dated Apr. 23, 2012 (4 pages).
Re-examination of U.S. Pat. No. 7,810,729/Control No. 95/001,618: Transmittal of Communication to Third Party Requester in Inter Partes Reexamination with Action Closing Prosecution (nonfinal), dated Apr. 2, 2012 (38 pages).
Re-examination of U.S. Pat. No. 7,810,729/Control No. 95/001,618: List of References, dated Apr. 2, 2012 (2 pages).
Re-examination of U.S. Pat. No. 7,810,729/Control No. 95/001,618: Search Notes, dated Apr. 2, 2012 (1 page).
Re-examination of U.S. Pat. No. 7,810,729/Control No. 95/001,618: Information Disclosure Statement by Applicant, dated Mar. 8, 2012 (4 pages).
Re-examination of U.S. Pat. No. 7,810,729/Control No. 95/001,618: Litigation Search Report CRU 3999 for U.S. Pat. No. 7,810,729, dated Mar. 7, 2012 (32 pages).
Re-examination of U.S. Pat. No. 7,810,729/Control No. 95/001,618: Information Disclosure Statement by Applicant, dated Feb. 23, 2012 (4 pages).
Re-examination of U.S. Pat. No. 7,810,729/Control No. 95/001,618: Comments on Patent Owner's Petition under 37 C.F.R. 1.181/1.182 to Reopen Prosecution of Pending Inter Partes Reexamination of '729 Patent, dated Feb. 17, 2012 (4 pages).
Re-examination of U.S. Pat. No. 7,810,729/Control No. 95/001,618: Comments on Patent Owner's Comments to Action Closing Prosecution (ACP) on '729 Patent, dated Feb. 17, 2012 (42 pages).
Re-examination of U.S. Pat. No. 7,810,729/Control No. 95/001,618: Declaration under 37 C.F.R. 1.132 of Bob Lee, dated Feb. 17, 2012 (7 pages).
Re-examination of U.S. Pat. No. 7,810,729/Control No. 95/001,618: Petition under 37 C.F.R. 1.181/1.182 to Reopen Prosecution, dated Jan. 17, 2012 (5 pages).
Re-examination of U.S. Pat. No. 7,810,729/Control No. 95/001,618: Response to Office Action mailed Dec. 14, 2011, dated Jan. 17, 2012 (35 pages).
Re-examination of U.S. Pat. No. 7,810,729/Control No. 95/001,618: Supplemental Declaration under 37 C.F.R. 1.132 of Robert E. Morley, Jr., dated Jan. 17, 2012 (9 pages).
Re-examination of U.S. Pat. No. 7,810,729/Control No. 95/001,618: Transmittal of Communication to Third Party Requester in Inter Partes Reexamination with Action Closing Prosecution, dated Dec. 14, 2011 (29 pages).
Re-examination of U.S. Pat. No. 7,810,729/Control No. 95/001,618: Transmittal of Communication to Third Party Requester in Inter Partes Reexamination with Action Closing Prosecution, dated Nov. 23, 2011 (29 pages).
Re-examination of U.S. Pat. No. 7,810,729/Control No. 95/001,618: List of References, dated Nov. 23, 2011 (2 pages).
Re-examination of U.S. Pat. No. 7,810,729/Control No. 95/001,618: Search Notes, dated Nov. 23, 2011 (1 page).
Re-examination of U.S. Pat. No. 7,810,729/Control No. 95/001,618: Comments on Patent Owner's Response to Office Action on '729 Patent, dated Sep. 30, 2011 (26 pages).

(56) References Cited

OTHER PUBLICATIONS

Re-examination of U.S. Pat. No. 7,810,729/Control No. 95/001,618: Information Disclosure Statement, dated Sep. 28, 2011 (5 pages).
Re-examination of U.S. Pat. No. 7,810,729/Control No. 95/001,618: Information Disclosure Statement by Applicant, dated Sep. 1, 2011 (5 pages).
Re-examination of U.S. Pat. No. 7,810,729/Control No. 95/001,618: Response to Office Action mailed Jul. 1, 2011, dated Sep. 1, 2011 (39 pages).
Re-examination of U.S. Pat. No. 7,810,729/Control No. 95/001,618: Transmittal of Communication to Third Party Requester in Inter Partes Reexamination with Order Granting/Denying Request for Inter Partes Reexamination, dated Jun. 23, 2011 (24 pages).
Re-examination of U.S. Pat. No. 7,918,394/Control No. 95/001,619: Transmittal of Communication to Third Party Requester in Inter Partes Reexamination with Notice of Intent to Issue Inter Partes Reexamination Certificate, dated Oct. 26, 2011 (6 pages).
Re-examination of U.S. Pat. No. 7,918,394/Control No. 95/001,619: Search Notes, dated Oct. 26, 2011 (1 page).
Re-examination of U.S. Pat. No. 7,918,394/Control No. 95/001,619: Issue Classification, dated Oct. 26, 2011 (1 page).
Re-examination of U.S. Pat. No. 7,918,394/Control No. 95/001,619: Litigation Search Report CRU 3999 for U.S. Pat. No. 7,198,394, dated Oct. 20, 2011 (37 pages).
Re-examination of U.S. Pat. No. 7,918,394/Control No. 95/001,619: Search Notes, dated Jul. 1, 2011 (1 page).
Re-examination of U.S. Pat. No. 7,896,248/Control No. 95/001,620: Transmittal of Communication to Third Party Requester in Inter Partes Reexamination with Right of Appeal Notice, dated Jun. 11, 2012 (26 pages).
Re-examination of U.S. Pat. No. 7,896,248/Control No. 95/001,620: Search Notes, dated Jun. 11, 2012 (1 page).
Re-examination of U.S. Pat. No. 7,896,248/Control No. 95/001,620: Transmittal of Communication to Third Party Requester in Inter Partes Reexamination with Action Closing Prosecution (nonfinal), dated Apr. 3, 2012 (49 pages).
Re-examination of U.S. Pat. No. 7,896,248/Control No. 95/001,620: List of References, dated Apr. 3, 2012 (4 pages).
Re-examination of U.S. Pat. No. 7,896,248/Control No. 95/001,620: Litigation Search Report CRU 3999 for U.S. Pat. No. 7,896,248, dated Mar. 9, 2012 (32 pages).
Re-examination of U.S. Pat. No. 7,896,248/Control No. 95/001,620: Information Disclosure Statement by Applicant, dated Mar. 8, 2012 (4 pages).
Re-examination of U.S. Pat. No. 7,896,248/Control No. 95/001,620: Comments on Patent Owner's Response to Office Action on '248 Patent, dated Feb. 23, 2012 (38 pages).
Re-examination of U.S. Pat. No. 7,896,248/Control No. 95/001,620: Declaration under 37 C.F.R. 1.132 of Bob Lee filed by 3rd Party, dated Feb. 22, 2012 (7 pages).
Re-examination of U.S. Pat. No. 7,896,248/Control No. 95/001,620: Lekernel's Scrapbook: Reading Magnetic Cards (Almost) for Free, dated 2006 (Exhibit B) (4 pages).
Re-examination of U.S. Pat. No. 7,896,248/Control No. 95/001,620: Information Disclosure Statement by Applicant, dated Feb. 23, 2012 (4 pages).
Re-examination of U.S. Pat. No. 7,896,248/Control No. 95/001,620: Response to Non-Final Office Action mailed Nov. 23, 2011, dated Jan. 26, 2012 (36 pages).
Re-examination of U.S. Pat. No. 7,896,248/Control No. 95/001,620: Supplemental Declaration under 37 C.F.R. 1.132 of Robert E. Morley, Jr., dated Jan. 23, 2012 (12 pages).
Re-examination of U.S. Pat. No. 7,896,248/Control No. 95/001,620: Complaint for Correction of Inventionship on U.S. Pat. No. 7,810,729, dated Dec. 1, 2010 (7 pages).
Re-examination of U.S. Pat. No. 7,896,248/Control No. 95/001,620: Transmittal of Communication to Third Party Requester in Inter Partes Reexamination with Office Action in Inter Partes Reexamination, dated Nov. 23, 2011 (31 pages).
Re-examination of U.S. Pat. No. 7,896,248/Control No. 95/001,620: List of References, dated Nov. 23, 2011 (1 page).
Re-examination of U.S. Pat. No. 7,896,248/Control No. 95/001,620: List of References, dated Nov. 23, 2011 (4 pages).
Re-examination of U.S. Pat. No. 7,896,248/Control No. 95/001,620: Search Notes, dated Nov. 23, 2011 (1 page).
Re-examination of U.S. Pat. No. 7,896,248/Control No. 95/001,620: Comments on Patent Owner's Response to Office Action on '248 Patent, dated Sep. 30, 2011 (28 pages).
Re-examination of U.S. Pat. No. 7,896,248/Control No. 95/001,620: Information Disclosure Statement, dated Sep. 28, 2011 (5 pages).
Re-examination of U.S. Pat. No. 7,896,248/Control No. 95/001,620: Information Disclosure Statemnet by Applicant, dated Sep. 28, 2011 (4 pages).
Re-examination of U.S. Pat. No. 7,896,248/Control No. 95/001,620: Information Disclosure Statement by Applicant, dated Sep. 1, 2011 (5 pages).
Re-examination of U.S. Pat. No. 7,896,248/Control No. 95/001,620: Response to Non-Final Office Action mailed Jul. 1, 2011, dated Sep. 1, 2011 (38 pages).
Extended European Search Report mailed Jun. 27, 2012 which issued in corresponding European Patent Application No. 10745874.7 (7 pages).

* cited by examiner

APPARATUS AND METHOD FOR COMMERCIAL TRANSACTIONS USING A COMMUNICATION DEVICE

CROSS-REFERENCE TO RELATED APPLICATIONS

This application is a continuation of and claims priority to Ser. No. 13/957,530, filed Aug. 2, 2013, now allowed, which is a continuation of U.S. patent application Ser. No. 13/283, 314, filed Oct. 27, 2011, now U.S. Pat. No. 8,534,554, which is a continuation of U.S. patent application Ser. No. 13/239, 512, filed on Sep. 22, 2011, now U.S. Pat. No. 8,281,998, which is a continuation of U.S. patent application Ser. No. 13/162,001, filed on Jun. 16, 2011, now U.S. Pat. No. 8,286,875, which is a continuation of International Application No. PCT/IB2010/001367, filed on Feb. 10, 2010, which claims the benefit of U.S. Provisional Application No. 61/151,459, filed on Feb. 10, 2009, all of which are incorporated by reference in their entirety.

FIELD OF THE INVENTION

The present invention relates to an apparatus and a method for commercial transactions using a communication device. More particularly, but not exclusively, the present invention relates to an apparatus and a method of transactions via a wireless or a landline communications device using a transaction card.

BACKGROUND OF THE INVENTION

Electronic fund transfer over mobile phones is growing popular. Many systems include combining a point of sale (POS) device with a wireless communication device such as a cell phone.

These POS devices include a processor as well as an input device to receive and process information from a transaction card such as a debit card, a credit card, a cash card, a stored value card, an ATM card or combinations thereof and the like. The input device may include a bar code reader, a magnetic stripe reader, an integrated circuit reader, a smartcard reader, a fingerprint scanner, an optical scanner, a signature pad, an alphanumeric keypad (including a PIN pad), a proximity detector, an audio recording device, a camera or combinations thereof and the like. The processor of the POS device receives information from the transaction card and sends it to a remote computer via a communication network. This information can be transmitted by the processor via the wireless communication device. The wireless communication device includes a transceiver, a communication port or any other type of similar communication device capable of transmitting information received by the portable transaction device processor from the transaction card to the remote computer. The communication link between the remote computer and the wireless communication device can be provided by the processor of the wireless communication device. The portable transaction device can also include a Global Positioning System (GPS) locator chipset so the location of the POS can be tracked by the remote computer. The remote computer sends the information it has received to the processor of the institution that has issued the transaction card that is being used. The processor of this institution validates the requested transaction and sends this information to the processor of the portable transaction device via the remote computer and the wireless communication device which are linked to each other by way of the aforementioned communication network.

Known systems which combine POS devices with wireless communication devices present certain drawbacks such as the inconvenient length of time to receive information regarding whether or not a given transaction has been accepted or refused. Other systems currently available include PayPal mobile, Obopay, Swipepay mobile. These solutions use either SMS or FPRS as the means of communication. However, these communication methods often suffer from an unbounded delay or become unavailable in locations where these services are not provided. Another drawback of existing systems is that they require registration and installation of software which are usually inconvenient for users to install. More importantly, these systems do not work for all mobile phones given the many different combinations of hardware and software platforms. Moreover, these solutions are not secure. They are prone to spyware or keylogger. Hence they are not compliant with payment card industry standards such as PCI PED.

OBJECTS OF THE INVENTION

An object of the present invention is to provide an apparatus for commercial transactions using a transaction card via a communication device in audio communication with a remote processor assembly.

An object of the present invention is to provide a system for commercial transactions using a transaction card via a communication device method for commercial transactions using a communication device.

An object of the present invention is to provide a method for commercial transactions using a transaction card via a communication device An object of the present invention is to provide an apparatus for wireless transactions.

An object of the present invention is to provide a method for wireless transactions.

SUMMARY OF THE INVENTION

In accordance with an aspect of the present invention, there is provided an apparatus for commercial transactions using a transaction card via a communication device in audio communication with a remote processor assembly, the apparatus comprising:

an input device for capturing information from the transaction card;

a controller for converting the captured card information into an audio signal; and a communication link for being connected to the communication device for the transmission of audio signals therebetween;

wherein when the input device captures the card information, the controller converts the card information into an audio signal that is transmitted via the communication link to the communication device for transmission thereof to the remote processor assembly for conversion of the audio signal into a digital signal and for validation of the card information.

In an embodiment, the input device is further adapted to receive additional transactional information directly from a user; the controller is adapted to convert said additional information into an audio signal.

In an embodiment, the remote processor assembly converts and transmits the card validation information as an audio signal to the communication device which transmits this audio signal to the controller via the communication link, the controller being further adapted to convert this audio signal into a digital signal.

In an embodiment, the apparatus further comprises an output device for communicating the digital signal regarding the card validation information to the user.

In accordance with an aspect of the present invention, there is provided a system for commercial transactions using a transaction card via a communication device, the system comprising:

a transaction apparatus adapted to capture information from the transaction card and to convert the captured card information into an audio signal, the transaction apparatus being linked to the communication device for the transmission of audio signals therebetween; and a transaction server adapted to convert an audio signal into a digital signal, the transaction server being linked to the communication device for the transmission of audio signals therebetween and to a remote processor/issuer adapted to validate the transaction card information for the transmission of digital signals therebetween, wherein when the transaction apparatus captures the card information it is converted into an audio signal and transmitted to the communication device for transmission to the transaction server to be converted to a digital signal and transmitted to the remote processor/issuer for validation.

In an embodiment, the transaction server is further adapted to convert a digital signal into an audio signal, wherein when the transaction server receives the digital signal of the validation information from the remote processor/issuer it is converted to an audio signal and sent to the communication device which transmits this audio signal to said transaction apparatus.

In an embodiment, the transaction apparatus is further adapted to convert an audio signal into a digital signal, wherein when the transaction apparatus receives the audio signal of the validation information form the communication device it is converted to digital signal.

In an embodiment, the transaction apparatus comprises an output device for communicating the digital signal regarding the card validation information to a user.

In an embodiment, the transaction apparatus is adapted to receive additional transactional information directly from a user and to convert this additional information into an audio signal.

In accordance with an aspect of the present invention, there is provided a method for commercial transactions using a transaction card via a communication device, the method comprising:

capturing information from a transaction card;
converting the captured information to an audio signal;
transmitting the audio signal to a communication device;
transmitting the audio signal from the communication device to a server adapted to convert audio signals;
converting the audio signal to a digital signal;
transmitting the audio signal to a processor for validating card information; and
validating the digital signal of the card information.

In an embodiment, the method further comprises:
transmitting the digital signal of the validation information to a server adapted to convert digital signals;
converting the digital signal of the validation information to an audio signal;
transmitting the audio signal of the validation information to the communication device.

In an embodiment, the method further comprises:
transmitting the audio signal of the validation information from the communication device to a controller adapted to convert audio signals;
converting the audio signal to a digital signal; and
communicating the validation information via a user interface.

In accordance with an aspect of the present invention, there is provided an apparatus for commercial transactions using a transaction card via audio communication with a remote processor assembly, the apparatus comprising:

an input device for capturing information from the transaction card;
a controller linked to said input device for converting the captured card information into an audio signal; and
a communication device linked to the controller in audio communication with the remote processor assembly for the transmission of audio signals therebetween;
wherein when the input device captures the card information, the controller converts the card information into an audio signal that is transmitted via the communication device to the remote processor assembly for conversion of the audio signal into a digital signal and for validation of the card information.

In an embodiment, the input device and controller device are provided in a single unit that is selectively linked to the communication device. In an embodiment, the controller and the communication device are provided in a single unit that is selectively linked to the input device. In an embodiment, the controller is adapted to convert an audio signal into a digital signal.

In accordance with an aspect of the present invention, there is provided a system for commercial transactions using a transaction card comprising:

a transaction and communication assembly comprising an input device for capturing information from the transaction card, a controller linked to the input device for converting the captured card information into an audio signal, and a communication device linked to the controller;

a transaction server adapted to convert an audio signal into a digital signal, the transaction server being linked to the communication device for the transmission of audio signals therebetween and to a remote processor/issuer, adapted to validate the transaction card information, for the transmission of digital signals therebetween, wherein when the input device captures the card information it is converted by the controller into an audio signal and transmitted via the communication device for transmission to the transaction server to be converted to a digital signal and transmitted to the remote processor/issuer for validation.

In an embodiment, the controller is adapted to convert an audio signal into a digital signal. In an embodiment, the transaction server is adapted to convert a digital signal into an audio signal for transmission to said communication device.

In accordance with an aspect of the present invention, there is provided a system for commercial transactions using a transaction card comprising:

an input device for capturing information from the transaction card;
a controller linked to the input device for converting the captured card information into an audio signal;
an interface display linked to the controller;
a communication device linked to the controller;
a transaction server adapted to convert an audio signal into a digital signal, the transaction server being linked to the communication device for the transmission of audio signals therebetween and to a remote processor/issuer, adapted to validate the transaction card information, for the transmission of digital signals therebetween; and
a merchant server linked to the transaction server and providing a remote merchant interface to be accessed by a user for making a transaction, wherein when a transaction is requested via the merchant interface, the merchant server receives this requests and sends it to the transaction server which converts it to an audio signal for transmission to the controller via the communication device, the controller converts the audio signal into an appropriate format for being displayed to the user via said interface display, wherein when the input device captures the card information it is converted by said controller into an audio signal and transmitted via the communication device for transmission to the transaction server to be converted to a digital signal and transmitted to the remote processor/issuer for validation of the transaction request.

Other objects, advantages and features of the present invention will become more apparent upon reading of the following non-restrictive description of non-limiting illustrative embodiments thereof, given by way of example only with reference to the accompanying drawings.

BRIEF DESCRIPTION OF THE DRAWINGS

In the appended drawings, where like reference numerals denote like elements throughout and in where.

DETAILED DESCRIPTION OF ILLUSTRATIVE EMBODIMENTS

Figure 1:
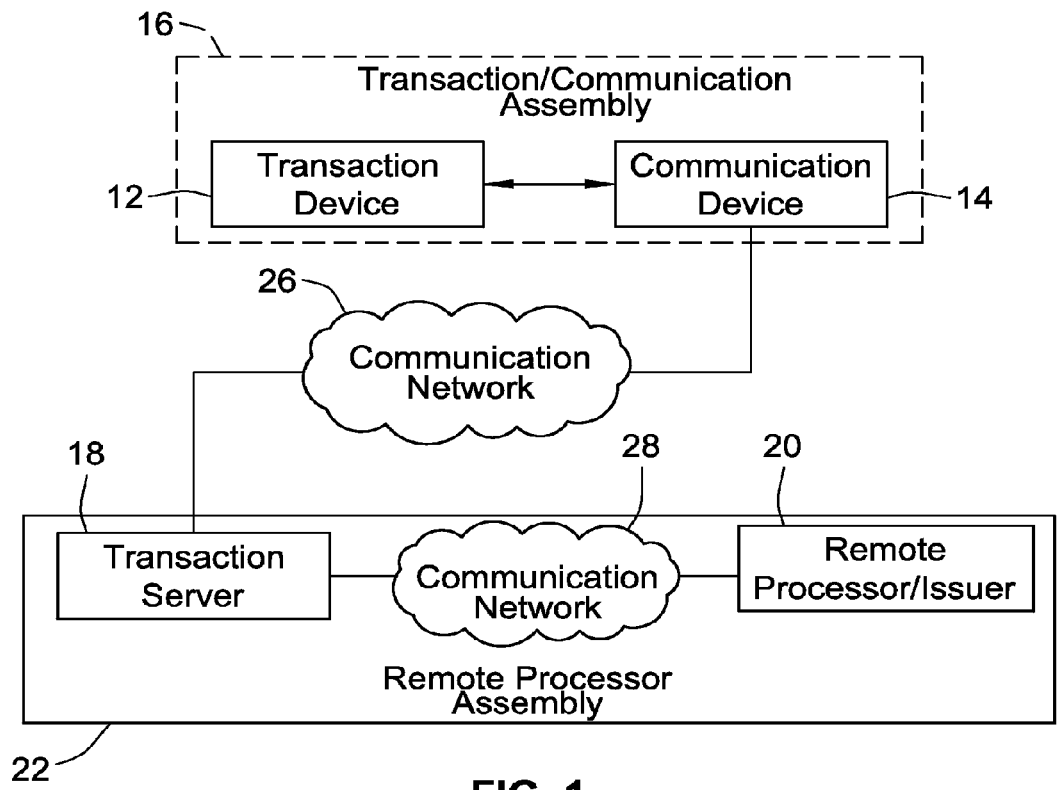
FIG. 1 is a flow diagram showing a transaction network in accordance with an non-restrictive illustrative embodiment of the present invention including a transaction/communication assembly and a remote processor assembly.

Generally stated and in accordance with an embodiment of the invention, there is provided an apparatus, a system and a method for transactions via transaction cards using a communication device. The communication device includes a wireless communication device, a mobile phone, a cellular phone, a landline phone, a personal digital assistant (PDA), a pager computer, a Smart Phone™, a Blackberry™, an iPhone™, a netbook and the like. The transaction card includes a payment card debit card, credit card, cash card, stored value card, ATM card and other electronic methods of payment as will be understood within the art. In an embodiment, the apparatus, system and method disclosed herein are related to e-commerce or m-commerce such as mobile payment and person-to-person money transfer. In an embodiment, the apparatus, system and method integrate mobile and internet payment. A variety of online transactions can be used within the context of the present invention.

In an embodiment, a transaction apparatus such as a portable point of sale (POS) device for example is linked to the communication device thereby providing a transaction device assembly. The transaction apparatus includes an input device to capture information from the transaction card, a controller to process this information. In an embodiment, the transaction apparatus includes an output for providing feedback to the user.

In an embodiment, the input device includes a bar code reader, a magnetic stripe reader, an integrated circuit reader, a smartcard reader, a fingerprint scanner, an optical scanner, a signature pad, an alphanumeric keypad (including a PIN pad), a proximity detector, an audio recording device, a camera or combinations thereof and the like. The input device is used to capture information including and not limited to card data (e.g. track data, ICC data) from the transaction card and other transaction data (transaction type/transaction amount) or identification data such as a Personal Identification Number (PIN), a Card Verification Code (CVC)) from the user.

The captured information is processed and converted by the controller to an audio format that can be suitable for transmission over an analog voice channel for example. The controller includes a secure microprocessor unit (MPU) or microcontroller unit (MCU).

In an embodiment, the output device includes a user interface such as a display screen for example an LCD (Liquid Crystal Display) or LED (Light emitting diode) screen, a buzzer, a speaker and other mechanisms.

Transaction data communication between the transaction apparatus and the communication device can be conducted by using any analog channel such as a hands-free interface, Blue tooth, or other communication link such as USB, Wifi and other technologies. For example, the processed card data information can be transmitted to the communication device via the analog hands-free jack in a mobile phone. Communication via this analog channel can be one-way or two-way depending on the implementation and usage.

The communication device receives the information and sends it to a remote transaction processing server computer via a communication network. This information can be transmitted via the communication device which includes a transceiver, a communication port or any other type of similar communication device capable of transmitting information captured by the transaction apparatus. The transaction processing server computer sends the information it has received to a remote processor of the institution that has issued the transaction card that is being used (the remote processor/issuer). The remote processor/issuer validates the requested transaction and either approves or rejects the transaction. The transaction result is then returned to the transaction processing server computer which in turn returns the result to the communication device. Optionally, the communication device may send the result to the transaction apparatus. Depending on the implementation and usage, the transaction result can be displayed on both or either one of the communication device or the transaction device.

With reference to the appended drawings, illustrative embodiments of the present invention will be described herein so as exemplify the invention and by no means limit the scope thereof FIG. 1 shows a transaction network 10 including a transaction apparatus 12 and communication device 14 which together form a transaction and communication assembly 16. The transaction apparatus 12 captures transaction data and, in some implementations, provides a user with feedback. Also shown is a transaction server 18 and a transaction processor/issuer 20 which together form a remote processor assembly 22. A request for a transaction occurs at the transaction apparatus 12 via a transaction card 24 (see FIG. 4). The transaction apparatus 12 captures information from the transaction card and converts this information into an audio signal. The audio signal is transmitted to the communication device 14 for transmission to the transaction server 18 via a communication network 26 (e.g. Internet, GSM/GPRS network). At the transaction server 18, the audio signal is converted into a digital signal and transmitted to the remoter processor/issuer 20 via a communication or payment network 28 (e.g. Internet, Visa-Net, BankNet). The remoter processor/issuer 20 validates this request by accepting or denying the request and sends this validation information to the transaction server 18 which then converts this digital signal into an audio signal and transmits it back to the assembly 16 providing the seller and buyer with a confirmation or a rejection message. As such, the communication device 12 acts as a receiver of the transaction data in analog audio format and also as a conduit to transmit the transaction data to a transaction server 18 via the communication network 26.

Figure 2:
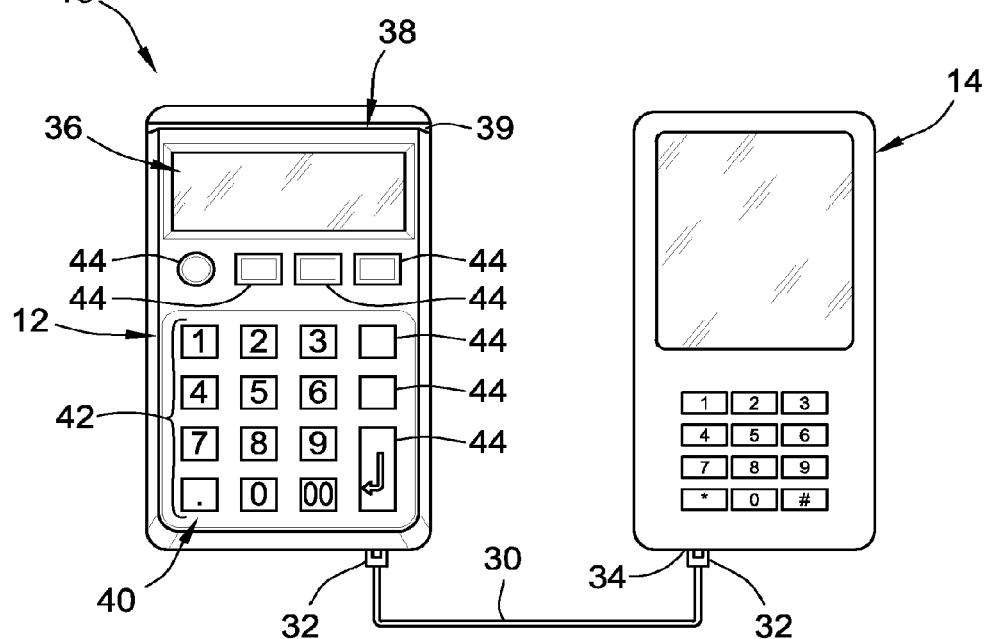
FIG. 2 is a front view of a transaction/communication assembly in accordance with an non-restrictive illustrative embodiment of the present invention.
Figure 3:
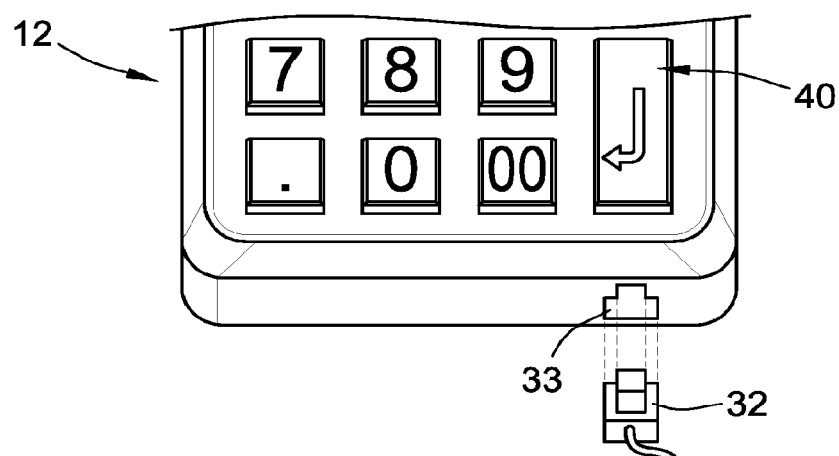
FIG. 3 is a bottom perspective view of the transaction apparatus of the transaction/communication assembly of FIG. 2.
Figure 4:
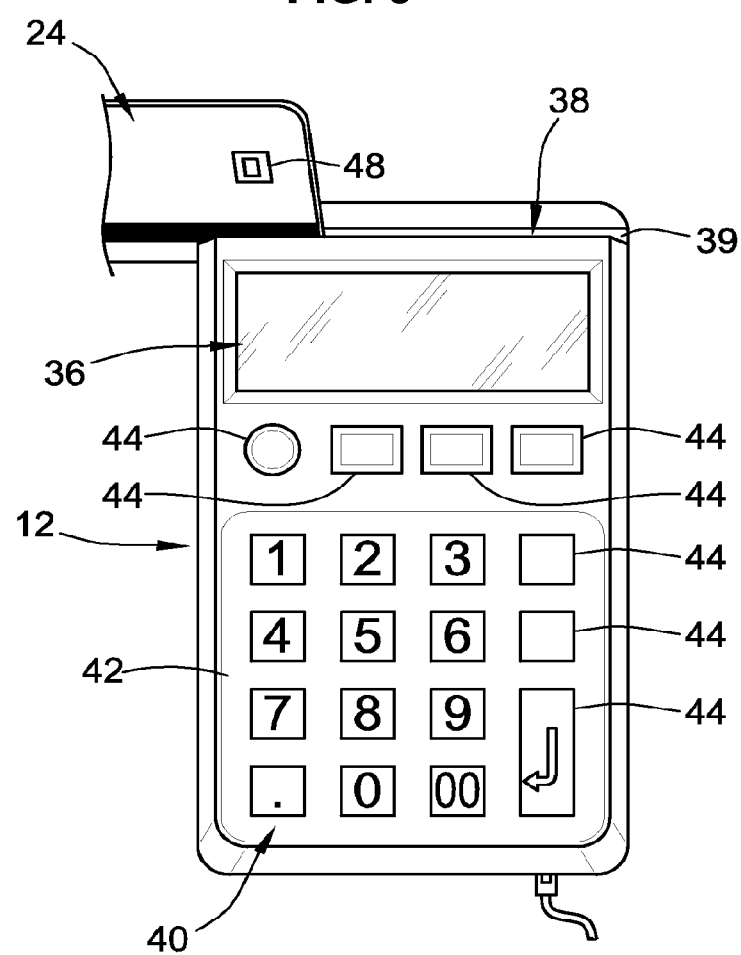
FIG. 4 is a front view of the transaction apparatus of the transaction/communication assembly of FIG. 2, shown here capturing information from a transaction card.

With reference to FIGS. 2, 3 and 4, an example of a transaction and communication assembly 16 is shown including a portable transaction apparatus 12 in the form of a point of sale (POS) device linked to a communication device in the form of mobile phone 20 via a communication link in the form of a cable 30. The cable 30 includes a pair of opposite connector ends 32 for being mounted to the phone jack 33 (see FIG. 3) of the POS device 12 and the jack 34 of the mobile phone 20.

The POS device 12 includes an output device such as a user interface in the form of a display screen 36 which can be an LCD screen for example. The display screen 36 displays transaction information and instructions as well as providing other feedback to the user. The POS device 12 also includes an input device 38 such as card reader slot 39 for swiping or inserting the transaction card 24 and capturing information therefrom. The POS device 12 can also include an additional input device 40 in the form of a control pad including a PIN pad 42, and other control buttons 44 allowing the user to enter transaction information which is also captured by the POS device 12 and converted into an audio signal for transmission to the communication device 14.

The transaction card 24 includes a magnetic stripe 46 as well as an IC chip 48.

Figure 5:
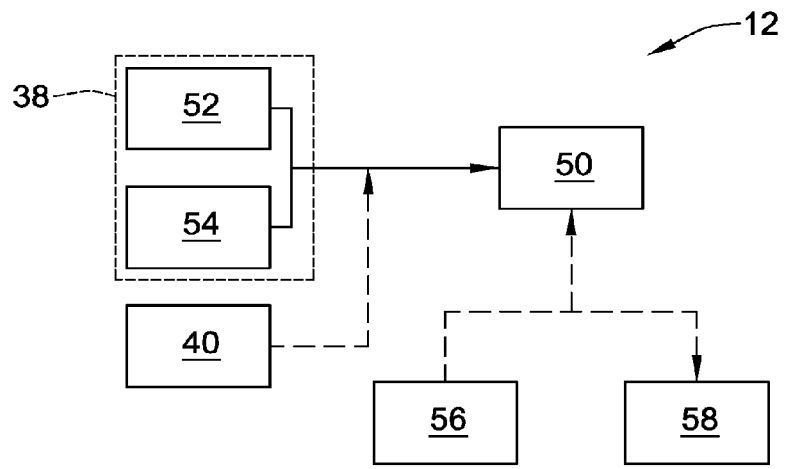
FIG. 5 is a flow diagram of the control system of a transaction apparatus in accordance with an non-restrictive illustrative embodiment of the present invention.

With reference to FIG. 5, the transaction device 12 includes a controller 50 in the form of a microcontroller unit (MCU). The input device 38 can be in the form of an analog signal reader 52 such as a magnetic stripe reader and/or a digital signal reader 54 such as an Integrated Circuit (IC) or Smart Card or EMV reader. In an embodiment, the transaction apparatus 12 is powered by a power source 56 optionally includes a printer 58 such as a thermal printer for example. As mentioned above, in an embodiment, the input system of the transaction apparatus 12 includes the input device 38 as well as an additional input device in the form of a control pad 40.

With reference to FIGS. 1 to 5, the general operation of the invention will now be described in accordance with a non-limiting illustrative embodiment thereof In order to execute a commercial transaction, the user swipes the card 24 through the slot 39; the analog information on the magnetic stripe 46 is captured by the magnetic stripe reader 52 and transferred to the MCU 50. In another embodiment, the digital information from the IC chip 48 is captured by the digital signal reader 54 and is transferred to the MCU 50. Optionally, a PIN number may also be required to be entered via the PIN pad 42 and the data is encrypted by the MCU 50.

The transaction data whether originally received in analog format or in encrypted digital format is converted by the MCU 50 into an analog audio signal suitable for transmission over the analog communication link between the transaction device and the communication device. In this example, this audio signal is then transmitted to the mobile phone via cable 30.

Transaction data is then transmitted to the transaction server 18 for processing. The transaction server 18 decrypts the signal and converts it into a digital signal. This data is then transmitted to the processor/issuer 20 for validation. The processor/issuer 20 receives the transaction data and then validates the information in order to accept or reject the requested transaction. Once the transaction has been accepted or rejected, the processor/issuer 20 produces a message confirming the foregoing and transmits this information back to the transaction server 18 in digital format.

The transaction server 18, having received the message from the processor/issuer 20, converts it into an audio signal and transmits this information via the communication network 26 back to the mobile phone 14.

The mobile phone 14 transmits the message back to the portable transaction device 18 via cable 30. The MCU 50 decodes the analog audio signal and converts it back into appropriate data format for processing and display via screen 36.

In another embodiment, the binary digital signal, whether originally received in analog format or in encrypted digital format is compressed by the MCU 50 and converted into a hexadecimal signal. This hexadecimal signal is then further compressed by the MCU 50 and converted into a dual-tone multi-frequency (DTMF) audio signal. This DTMF signal is then transferred by the MCU 50 to the mobile phone 14 and transmitted to the transaction server 18.

The transaction server 18 decompresses the DTMF signal and converts into a hexadecimal signal. This hexadecimal signal is then further decompressed by the transaction server 18 and converted into a binary digital signal. The transaction server 18 then transmits this binary digital signal to the remote processor/issuer 20. The remote processor/issuer 20 receives the binary digital signal and then validates the information in order to accept or reject the requested transaction. Once the transaction has been accepted or rejected, the processor/issuer 20 produces a binary digital signal confirming the foregoing and transmits this information to the transaction server 18. The binary digital signal is compressed into a hexadecimal signal and then recompressed into a DTMF audio signal which is then transmitted to the mobile phone 14. The mobile phone 14 then transmits this DTMF audio signal to the MCU 50 which decompresses the DTMF audio signal and converts it into a hexadecimal signal. Finally this hexadecimal signal is then further decompressed and converted into an appropriate data format to be displayed via screen 36.

Therefore, in an embodiment, there is provided a payment system consisting of a transaction apparatus 12 and a transaction server 18. The transaction apparatus 12 allows for card data and PIN capture via the input device 38 and the control pad 40. The controller 50 controls the operation flow of the transaction apparatus; it provides the encryption required for transaction and other channel encryptions as well as memory. Audio communication between the transaction apparatus 12 and the transaction server 18 is provided by the communication device 14. Operation of the transaction apparatus is displayed on the user interface (the display screen) 36. The transaction server 18 is used to decrypt the data sent by the communication device 14 where the data is translated and forwarded to the payment network 28 including a processor/issuer 20 for further processing.

For example, in transactions such as in taxi or limousine services, the driver swipes the credit card 24 of the passenger in the magnetic stripe reader 52 of the POS device 12 which converts this analog data into an audio signal and is connected to the driver's mobile phone 14 via the hands-free jack 34 for transmitting this data. The mobile phone 14 sends the audio signal to the remote transaction server computer 18 via the communication network 26 between the transaction server computer 18 and the mobile phone 14. The transaction server computer 18 communicates with the remote processor/issuer 20 of the financial institution that issued the passenger's credit card 24 and validates the requested transaction by accepting or refusing it. The foregoing information is then sent back to the transaction server computer 18 which converts it to an audio signal that is sent to the POS device 12 via the mobile phone 14. The display screen 36 informs the driver and the passenger if the transaction was accepted or not.

In another example, the apparatus, system and method provide for online purchasing or money transferring. Hence, the transaction apparatus 12 is used for online purchase or money transfer.

Figure 6:
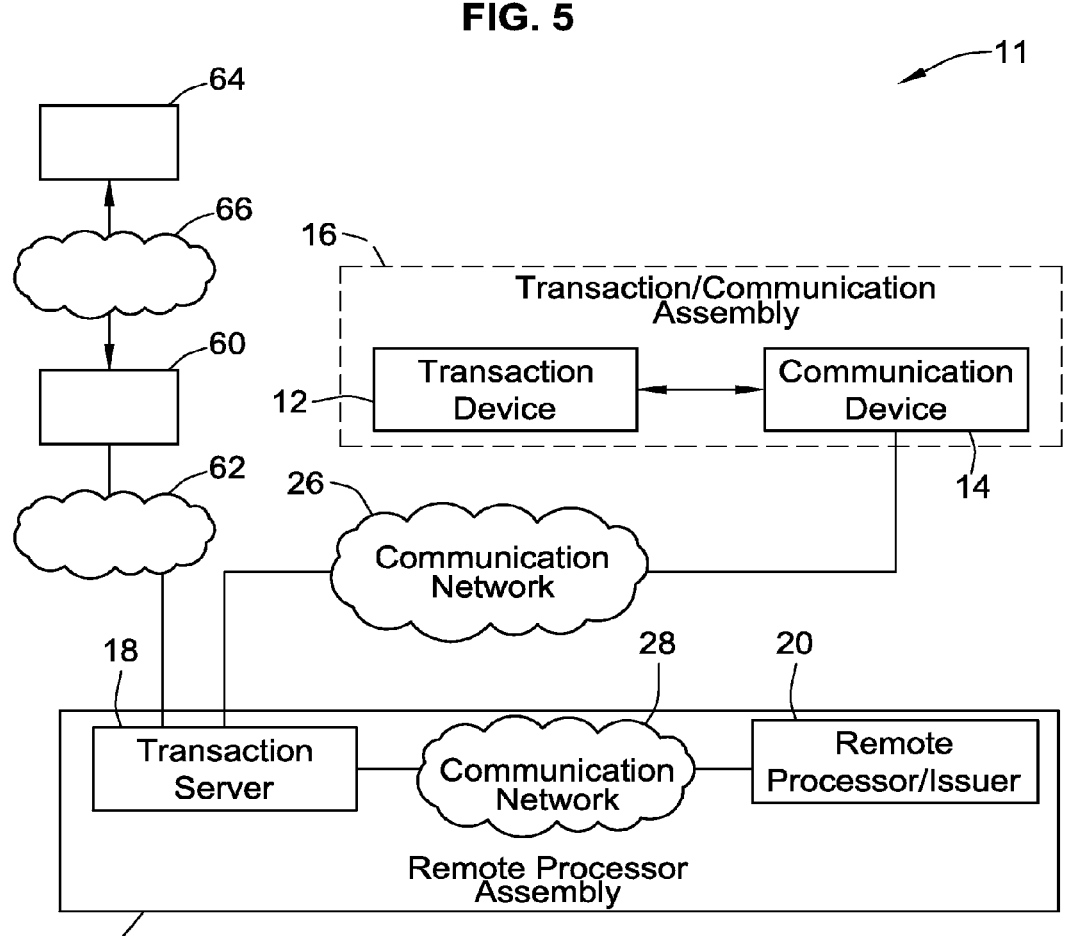
FIG. 6 is a flow diagram showing a transaction network in accordance with another non-restrictive illustrative embodiment of the present invention including a transaction/communication assembly, a remote processor assembly a merchant server and an associated remote interface.

FIG. 6 shows a transaction network 11 similar to the transaction network 10 but including a merchant server 60 in communication via a communication network 62 with the transaction serve 18 and with a merchant interface 66 provided by a remote device such as a computer via a communication network 66 (e.g. the internet).

Therefore, there is provided an online system for commercial transactions using a transaction card 24 via a communication device 14. The system is exemplified by the transaction network 11 and includes a transaction apparatus 12 linked to the communication device 14, a merchant server 60 providing a remote interface 66 to be accessed by the user and a transaction server 18 linked to both the communication device 14 and the merchant server 60. The merchant 66 interface allows for requesting a transaction. The merchant server 60 sends this request to the transaction server 18 which converts this information into an audio signal and sends this audio signal to the communication device 14 since it is linked therewith for the transmission of audio signals therebetween. The audio signal from the communication device 14 is sent to the transaction apparatus 12 which converts it to an appropriate format so as to be displayed through the display screen 36. The user then follows the displayed instructions and makes a payment as previously described.

In one example, the user accesses the merchant interface 66 such as a website to purchase. During checkout, the user selects the present method as payment and enters their mobile phone number in the merchant website 66. The merchant website 66 sends the user phone number along with the purchase details to the transaction server 18 via the merchant server 60 and communication networks 66 and 662. The transaction server 18 receives the request from the merchant and calls the phone number provided by the user. The mobile phone 14 picks up the call, the transaction information including the payment amount, merchant name and the like is sent from the transaction server 18 to the mobile phone 14 in audio form such as through a global system for mobile (GSM) network 26 in DTMF waveform for example. The user connects the transaction apparatus 12 to their mobile phone 14 and proceeds with the payment instructions displayed on the display screen 36. The user may have also connected their mobile phone 14 to the transaction apparatus 12 prior to entering their phone number in the merchant website 64. The transaction apparatus 12 receives the audio signal through the hands-free output interface or jack 34. The controller 50 inside the transaction apparatus 12 decodes the transaction information and the transaction data are displayed to the user on the screen 36. Following the instructions on the screen 36, the user swipes their transaction card 24 in the slot 39 of the magnetic card reader 50.

The data is then sent to the mobile phone 14 in analog audio form. Thus, the mobile phone 14 receives the analog audio data as a normal audio input. The mobile phone 14 then encodes the audio input using for example the normal GSM voice codec and sends this audio to the calling transaction server 18. The transaction server 18 receives the data in analog audio form, decodes the data to recover the transaction card data and the payment details. The transaction data is reformatted and sent to the remote processor/issuer 20 which either approves or rejects the transaction. The transaction result is sent back to the transaction server 18. The transaction server 18 transforms the transaction data to an audio signal such as DTMF waveform and sends it to the mobile phone 14 and in turn to the transaction apparatus 12. The transaction apparatus 12 decodes the data and displays the transaction result on to the screen 36 to inform the user. A receipt is sent to the email of the user as a record and the online purchase is completed. In the above embodiment, it should be noted that the mobile phone 14 does not require installation of any software and it acts only as a conduit of analog audio for data communication between the transaction a and the transaction server.

Figure 7:
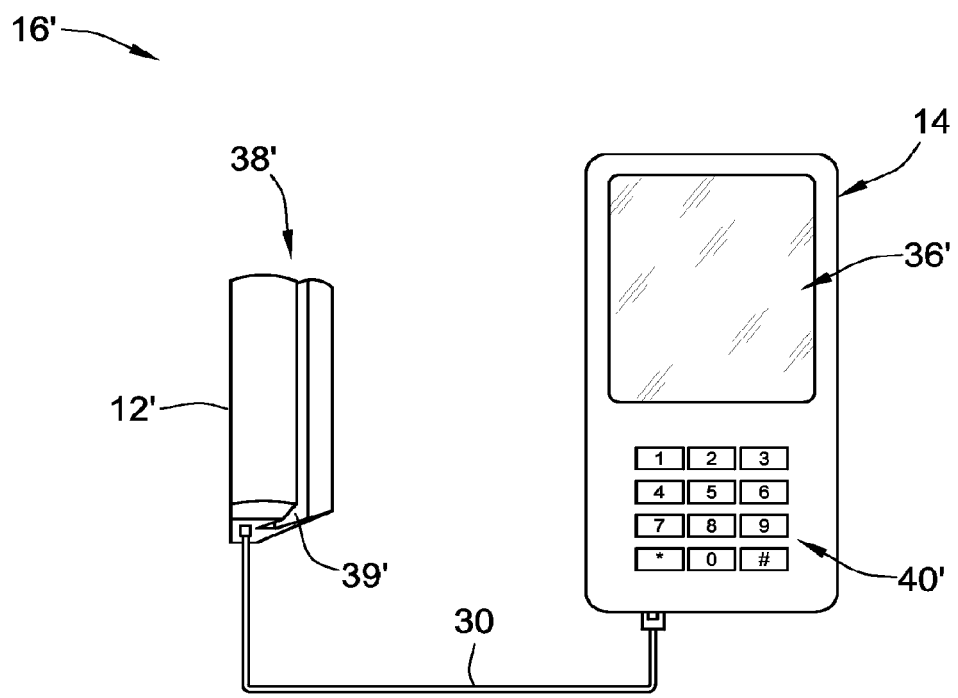
FIG. 7 is a front view of a transaction/communication assembly in accordance with another non-restrictive illustrative embodiment of the present invention.
Figure 8:
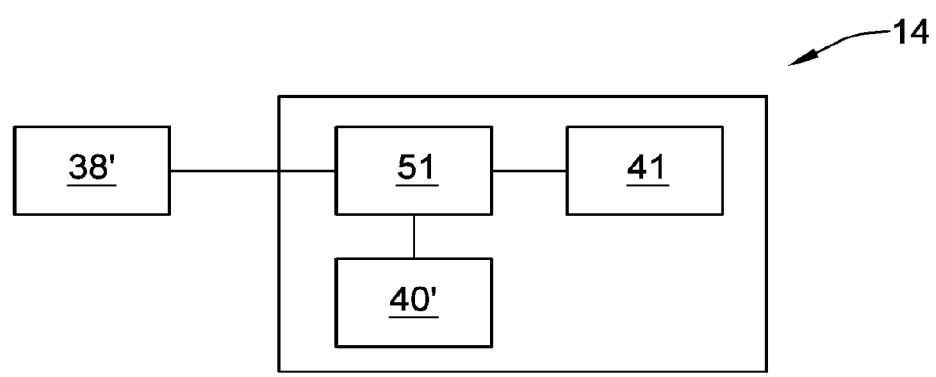
FIG. 8 is flow diagram of the control system of the communication device of the transaction/communication assembly of FIG. 7.

With reference to FIGS. 7 and 8, there is shown another embodiment of the transaction and communication assembly, denoted here as 16'.

The assembly 16' includes a communication device 14 (a mobile phone) linked via a cable 30 to a transaction apparatus 12'. The transaction apparatus 12' comprises one-way device without a screen or control pad and as such, only includes an input device 38' in the form of a slot 39' for capturing information from a transaction card 24 and sending this information without conversion directly to the mobile phone 14 via cable 30. The output device of the assembly 16' is provided by the mobile phone 14 in the form of its display screen 36'. The additional input device of the assembly 16' is also provided by the mobile phone 14 in the form of a control pad 40' or keypad. Furthermore, the controller 51 of the mobile phone 14 is the controller of the assembly 16'. As such, in this embodiment, installation of a software application controller 51 is necessary. This software application is used to convert between audio and digital signal and to receive and transmit and audio data to and from the hands-free interface 41.

For example, to send money, the sender plugs the transaction apparatus 12' into the mobile phone 14 and selects via the keypad 40' a "send money" function on the software application displayed via screen 36'. The user enters the recipient phone number or email address and transaction amount. Following instructions on the mobile phone application via screen 36', the user swipes the transaction card 24 against the card reader slot 39' on the transaction apparatus 12'. The analog signal from the magnetic card 24 is sent via the hands-free interface 41 where the software application of the controller 51 converts the received signal back to binary data for example as stored on the magnetic card 34. Optionally, the user has to enter their PIN for authentication as in the case of a debit card transaction through the software application.

As explained above with respect to the transaction network 10 of FIG. 1, after the user has confirmed the transaction, a call is made to the transaction server 18. The transaction card data, along with the transaction data, are encoded and sent to the transaction server 18 in the form of general-packet radio-service (GPRS) data. The transaction server 18 decodes the transaction data, reformats and sends this data to the processor/issuer 20 for approval. This validation information data is then returned to the transaction server 18. The validation data is sent back from the transaction server 18 to the mobile phone 14 in audio format and converted by the software application in the controller 51 for displayed to the user via screen 36. For recording purpose, a receipt is sent as an email and/or SMS to the sender. Another message is sent to the recipient either as an email or SMS to inform the recipient of the transaction and provides the recipient with the transaction number and authentication number for accessing the transaction.

In another example, in order to receive money, the recipient plugs the transaction apparatus 12' into the mobile phone 14 and selects the "receive money" function on the software application. The user enters the transaction number and authentication number. Following instructions on the mobile phone 14 application, the user swipes the card 24 against slot 39' of transaction apparatus 12'. The analog signal from the magnetic card is sent via the hands free interface 41 where the software application of the controller 51 converts the received signal back to binary data as stored on the magnetic card. Optionally, the user has to enter his PIN for authentication as in the case of a debit card transaction through the software application.

After the user has confirmed the transaction, a call is made to the transaction server 18. The transaction card data, along with the transaction data, are encoded and sent to the transaction server 18 as GPRS data. The transaction server 18 decodes the transaction data, reformats and sends them to the processor/issuer for approval. The transaction result is then sent back from the transaction server 18 to the mobile phone 14 where the data is displayed to the user. For recording purpose, a receipt is sent as an email and/or SMS to the sender. Another message is sent to the recipient either as an email or SMS to inform the recipient of the transaction result.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of embodiments thereof, it can be modified, without departing from the spirit, scope and nature of the subject invention.

The invention claimed is:

1. A portable smart card reader device for reading a smart card, the device comprising:
 a sensor for reading information stored on an integrated circuit incorporated onto said smart card and for producing an encrypted analog signal indicative of the information;
 said sensor including circuitry for converting said encrypted analog signal to a format suitable for transmission to a hands-free jack of a mobile communication device; and
 an output jack adapted to be inserted into the hands-free jack associated with said mobile communication device for providing the converted encrypted analog signal indicative of the information to said mobile communication device for transmission to a transaction server for further processing.

2. The card reader device from claim 1, in which the smart card is selected from a group consisting of a chip card, EMV card, proximity detector or NFC card, contactless card, or any combination thereof.

3. The card reader device of claim 1, wherein said device comprises a device selected from the group consisting of: an analog signal reader, a digital signal reader, a bar code reader, a magnetic stripe reader, and integrated circuit reader, a smartcard reader, an EMV reader, and optical scanner, and any combination thereof.

4. The card reader device of claim 1, wherein the mobile communication device comprises a device selected from the group consisting of: a wireless communication device, a mobile phone, a cellular phone, a personal digital assistant, a pager, a computer, a smartphone, a Blackberry™, an iPhone™, an Android™ phone, an iPad™, and a tablet.

5. A method for reading a smart card, the method comprising the steps of:
 providing a portable card reader device comprising a sensor for reading information stored on the integrated circuit of a smart card, and an output jack adapted to be inserted into a hands-free jack associated with a mobile communication device;
 wherein said portable card reader device produces an encrypted analog signal indicative of the information stored on said integrated circuit;
 said encrypted analog signal suitable for transmission to said hands-free jack of said mobile communication device;
 providing said encrypted analog signal indicative of the information stored on the integrated circuit to said mobile communication device for further processing by circuitry contained in said mobile communication device; and
 transmitting said encrypted analog signal to a transaction server for further processing.

6. The card reader device from claim 5, in which the smart card is selected from a group consisting of a chip card, EMV card, proximity detector or NFC card, contactless card, or any combination thereof.

7. The card reader device of claim 5, wherein said device comprises a device selected from the group consisting of: an analog signal reader, a digital signal reader, a bar code reader, a magnetic stripe reader, and integrated circuit reader, a smartcard reader, an EMV reader, and optical scanner, and any combination thereof.

8. The card reader device of claim 5, wherein the mobile communication device comprises a device selected from the group consisting of: a wireless communication device, a cellular phone, a personal digital assistant, a pager, a computer, a smartphone, a Blackberry™, an iPhone™, an Android™ phone, an iPad™, and a tablet.

* * * * *